March 22, 1960 R. BOLLACK ET AL 2,929,126
PROCESS OF MAKING MOLDED ALUMINUM NITRIDE ARTICLES
Filed April 19, 1956
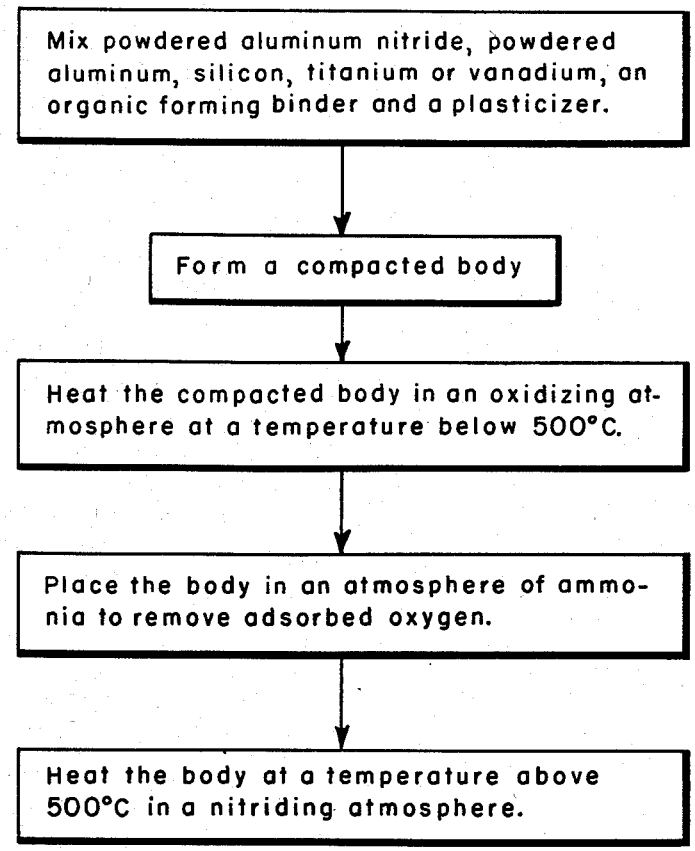
INVENTORS.
Raymond Bollack
Marcel Rey
BY
THEIR ATTORNEYS

United States Patent Office 2,929,126
Patented Mar. 22, 1960

2,929,126
PROCESS OF MAKING MOLDED ALUMINUM NITRIDE ARTICLES

Raymond Bollack, Chedde, and Marcel Rey, Versailles, France, assignors to Societe d'Electro-Chimie d'Electro-Metallurgie et des Acieries Electriques d'Ugine, Paris, France, a corporation of France Application April 19, 1956, Serial No. 579,178

5 Claims. (Cl. 25—157)

This invention relates to a process of making molded aluminum nitride articles. Aluminum nitride, whose general formula is $Al_2N_2$, is a very hard material having a hardness on Mohs' scale of 9. Its dissociation tension is nil at 2000° C. and its melting point is 2230° C. Moreover, it is chemically inert up to 2000° C. unless submitted to an oxidizing atmosphere and it is especially resistant to molten or gaseous aluminum. It has a good thermal conductivity and a very low electrical conductivity. Because of these properties, aluminum nitride can be used industrially as a refractory or abrasive material, yet attempts to produce molded aluminum nitride articles have not proved practical up to the present time.

If a refractory article composed only of aluminum nitride is desired, the aluminum nitride must be agglomerated by sintering which requires a temperature of 1800 to 2000° C., a temperature which is prohibitive due to its cost. On the other hand, molded articles composed of aluminum nitride bonded by a ceramic bond can be obtained by sintering at practical industrial temperatures, about 1400° C., but the refractory properties of the article are then partly destroyed.

Nitriding in situ of alumina has been proposed for the manufacture of aluminum nitride articles but, the molecular volume of alumina being higher than that of the nitride thus obtained, the nitrided articles have a porous structure which lowers their refractory properties.

Other methods using carbon in addition to nitrogen give products which are unstable in moist atmospheres because aluminum carbide, which is present in such articles, is decomposable by water vapor.

An object of the present invention is the provision of a process for the industrial manufacture of articles composed essentially of a compact structure of aluminum nitride crystals bonded together by one or more metal nitrides, preferably aluminum nitride, the article being free of metallic oxides and carbides and containing few impurities. These molded aluminum nitride articles can be used in many applications as refractories or abrasives.

The accompanying drawing is a flow sheet illustrating one way in which the present invention can be carried out.

The present invention is for a method of making molded aluminum nitride articles composed of industrial aluminum nitride bonded by a nitride of aluminum or a nitride of other metal such as silicon, titanium or vanadium, the aluminum or other metal being converted into nitride during the nitriding operation. The process consists essentially in heating in a nitriding atmosphere a compacted body composed of a powdered mixture of aluminum nitride, a small amount of at least one of the metals, an organic forming binder and a plasticizer for the binder.

In carrying out the method, one is guided by the following principles:

(a) The granulation (particle size) of the components should be such that the components can be highly compacted when subjected to forming pressure.

(b) The proportions of metal and aluminum nitride will vary according to the particular metal employed. However, these proportions should be such that the nitrided article has a higher compaction than the compaction of the molded body before nitriding. In other words, the nitrided article has less voids than the compacted but unnitrided body. Preferably, the nitrided article has a compaction of nearly 90%.

(c) The forming binder should be such as to enable high compaction during forming and should be capable of being entirely removed after molding and either prior to or during the nitriding step.

(d) The forming plasticizer should be non-aqueous in order to avoid any hydrolysis of the finer aluminum nitride crystals.

(e) The nitriding should be carried out at a temperature above 500° C. and the nitriding atmosphere should be free of oxidizing gases and as free as possible of carburizing gases.

The principles referred to can be carried out as follows:

(a') The main purpose of the granulation of the mixture components is to enable one to produce a highly compacted body from the mixture. A second object of this granulation is to eliminate aggregates of porous and brittle crystals. These two objects are accomplished if a well-defined particle size distribution is used (below a maximum size) which may be either a continuous particle size distribution or a discontinuous one. Industrial aluminum nitride does not contain any appreciable amount of brittle aggregates if grains above 1 mm. are removed. The process may be carried on by using either of the two following types (A and B) of high compaction particle size distribution:

| Components | Particle Size Distribution Type A, in Percent (Continuous) | Particle Size Distribution Type B, in Percent (Discontinuous) |
|---|---|---|
| Grains from 0.5 to 1 mm | 30 | 50 |
| Grains from 0.1 to 0.5 mm | 40 | 10 |
| Grains below 0.1 mm | 30 | 40 |

The maximum compaction which either of these particle size distributions permits one to obtain is about 74%.

(b') The proportioning of the main component, namely, aluminum nitride and aluminum or other metal to be nitrided, is one of the most important features of the invention. Theoretically, the quantity of metal to be added to the primary or pre-existing aluminum nitride should be such that the secondary nitride formed from the metal during the nitriding of the article fills all of the voids between the grains of the compacted body. Since, as previously stated, the maximum extent to which the grains can be compacted is 74%, it is known that the voids constitute at least 26% by volume of the compacted body. Calculations show that in order to fill up these voids the following quantities of the various metals would be required:

22% of powdered aluminum, or
23% of powdered silicon, or
45% of powdered titanium, or
48% of powdered vanadium Applicants have found that if the theoretical quantities of pulverulent metals above referred to are added to the primary aluminum nitride, a part of the melted metal exudes to the surface of the compacted body when it is heated for nitriding, thereby causing a loss of the metal and an obstruction of the pores so that the interior of the compacted body is not nitrided and the body remains porous.

According to the invention, however, in order to obtain the best results, the proportions of the metals should be about half the theoretical quantities, say:

- 8–12% aluminum
- 10–14% silicon
- 16–24% titanium
- 18–26% vanadium (c') As the forming binder, one may employ an organic material of high molecular weight which is soluble in organic solvents, for example, industrial waxes such as paraffin, ceresine, ozokerite or highly viscous polyglycols. It is known that these binders have the bonding and lubricating properties which, under forming pressure, allow the grains of material to glide on each other into the relative positions which produce a highly compact body.

(d') The plasticizer is an organic solvent for waxes, one of the least expensive being trichlorethylene.

The following examples of mixtures of the four essential materials, aluminum nitride, metal to be nitrided, binder and plasticizer, gave good results:

Example 1

Parts by weight
- Aluminum nitride. Particle size distribution type A __ 90
- Powdered aluminum for paints sized 100 microns and finer __ 10
- Ceresine __ 2
- Trichlorethylene __ 20

Example 2

- Aluminum nitride. Particle size distribution type B __ 88
- Powdered silicon sized 75 microns and finer __ 12
- Ceresine __ 2
- Trichlorethylene __ 20

Example 3

- Aluminum nitride. Particle size distribution type B __ 80
- Sponge titanium pulverized to 100 microns and finer __ 20
- Polyglycol 400 __ 3
- Trichlorethylene __ 20

Example 4

- Aluminum nitride. Particle size distribution type A __ 78
- Ferrovanadium 78% pulverized 150 microns and finer __ 22
- Ozokerite __ 4
- Trichlorethylene __ 20

These examples are not restrictive because the other metals mentioned or their mixtures may be used. Thus, in Example 3, the 20 parts of titanium may be replaced by 18 parts of titanium-aluminum alloy (containing 72% of titanium) pulverized to a fineness of 100 microns.

Preferably, the mixtures given in Examples 1–4 are made in three steps. The metal powder, wax and solvent are thoroughly mixed in a first mixer and the suspension is then poured onto the aluminum nitride grains contained in a second mixer and mixed. The aluminum nitride grains are rapidly and uniformly wetted by the suspension. The solvent is then evaporated and the mixture, which has turned sandy, is ready for molding.

The molding is done, for instance, by pressing the mixture in steel molds. The most compact bodies are obtained by pressing slowly the sandy mixture under a high pressure but not higher than 3000 kgs./cm.$^2$, the molds being kept at a temperature of about 80° C.

(e') After the compacted bodies are removed from the molds, they may be heated without any other intervening steps at a temperature above 500° C., preferably at 1400° C. or higher in an electric or other furnace and in a nitriding atmosphere. The nitriding atmosphere may be either purified commercial nitrogen or ammonia or a mixture of these two gases. After nitriding, the articles are relatively compact but their compaction does not exceed 78%. Though such a result is in accordance with the invention, better results are obtained by using a modified process such as described below, by which nitrided articles having a compaction of 88% or more can be obtained. The modified process is as follows and is illustrated in the accompanying drawing.

The compacted body is heated in an oxidizing atmosphere to eliminate the organic forming binder, for example, by heating in an oxidizing atmosphere at a temperature of about 450° C. This results in an article which is porous and brittle and has the appearance of a porcelain biscuit but which does not contain any traces of carbon which, if present, would be detrimental in that the carbon would carburize the article during the subsequent nitriding operation. The compacted body which has been heated in an oxidizing atmosphere holds in its pores adsorbed oxygen which may oxidize the metal powder before it is nitrided. In order to remove this adsorbed oxygen, the compacted biscuit-like body is maintained for about 48 hours in an atmosphere of cold ammonia. Ammonia replaces the adsorbed oxygen and the weight of the body increases by 10% or more. The body is then heated in an electric or other furnace at a temperature above 500° C., for example, at a temperature of 1400° C. or higher in a nitriding atmosphere of the type previously described.

Whether the compacted body is directly nitrided or whether it is subjected to an oxidizing heating followed by removal of oxygen prior to nitriding, the nitriding atmosphere should not contain more than 0.3% of oxygen whether the oxygen be in a free state or resulting from the decomposition of $CO_2$ according to the reaction $CO_2 = CO + O$. The article should be kept free from any contact with carbon or gaseous carbides during the nitriding step because in such a case nitrides are decomposed into carbides which are unstable in moist atmosphere. Such decomposition might cause the molded nitrided articles to split when stored in cold air.

Nitrided articles made according to the invention show no appreciable variation in volume as a result of the nitriding operation or after they have been stored in cold air for a long time. They may be used in a reducing medium for every refractory use, such as, furnace linings, muffles, crucibles, burners and diffusers, and in every abrasive use, such as, grinding wheels, buffing stones, cutting tools, wire drawing dies and thread guides, or in uses requiring both abrasive and refractory properties.

The invention is not limited to the preferred embodiment but may be otherwise embodied or practiced within the scope of the following claims.

We claim:

1. A process of making molded aluminum nitride articles, which comprises forming a compacted body composed of a powdered mixture of aluminum nitride, a small amount of at least one metal of the group consisting of aluminum, silicon, titanium and vanadium, an organic forming binder of high molecular weight and a non-aqueous solvent for said binder, heating the compacted body in an oxidizing atmosphere at a temperature below 500° C. to eliminate the organic forming binder, maintaining the body in an atmosphere of ammonia to remove adsorbed oxygen and heating the body at a temperature above 500° C. in a nitriding atmosphere.

2. A process of making molded aluminum nitride articles, which comprises forming a compacted body composed of a powdered mixture of aluminum nitride, about 8 to 12% by weight of aluminum, an organic forming binder of high molecular weight and a non-aqueous solvent for said binder, heating the compacted body in an oxidizing atmosphere to eliminate the organic forming binder, maintaining the body in an atmosphere of ammonia to remove adsorbed oxygen and heating the body at a temperature above 500° C. in a nitriding atmosphere.

3. A process of making molded aluminum nitride articles, which comprises forming a compacted body composed of a powdered mixture of aluminum nitride, about 10 to 14% by weight of silicon, an organic forming binder of high molecular weight and a non-aqueous solvent for said binder, heating the compacted body in an oxidizing atmosphere to eliminate the organic forming binder, maintaining the body in an atmosphere of ammonia to remove adsorbed oxygen and heating the body at a temperature above 500° C. in a nitriding atmosphere.

4. A process of making molded aluminum nitride articles, which comprises forming a compacted body composed of a powdered mixture of aluminum nitride, about 16 to 24% by weight of titanium, an organic forming binder of high molecular weight and a non-aqueous solvent for said binder, heating the compacted body in an oxidizing atmosphere to eliminate the organic forming binder, maintaining the body in an atmosphere of ammonia to remove adsorbed oxygen and heating the body at a temperature above 500° C. in a nitriding atmosphere.

5. A process of making molded aluminum nitride articles, which comprises forming a compacted body composed of a powdered mixture of aluminum nitride, about 18 to 26% by weight of vanadium, an organic forming binder of high molecular weight and a non-aqueous solvent for said binder, heating the compacted body in an oxidizing atmosphere to eliminate the organic forming binder, maintaining the body in an atmosphere of ammonia to remove adsorbed oxygen and heating the body at a temperature above 500° C. in a nitriding atmosphere.

References Cited in the file of this patent
UNITED STATES PATENTS

| | | |
|---|---|---|
| 1,099,131 | Serpek | June 2, 1914 |
| 2,362,825 | Hutchins | Nov. 14, 1944 |
| 2,618,565 | Nicholson | Nov. 18, 1952 |
| 2,636,828 | Nicholson | Apr. 28, 1953 |
| 2,728,128 | Sheer et al. | Dec. 27, 1955 |
| 2,741,822 | Udy | Apr. 17, 1956 |
| 2,745,763 | Ueltz | May 15, 1956 |
| 2,750,268 | Erasmus et al. | June 12, 1956 |
| 2,839,413 | Taylor | June 17, 1958 |

OTHER REFERENCES

"Refractory Hard Metals," by P. Schwarzkopf et al., Macmillan Co., 1953, pp. 226, 227.

J. W. Mellor: "Comprehensive Treaties in Inorganic and Theoretical Chemistry," vol. 8, pages 97, 111, 116, 118.